US008437735B2

(12) United States Patent
Abdel-Kader et al.

(10) Patent No.: US 8,437,735 B2
(45) Date of Patent: May 7, 2013

(54) EMERGENCY NUMBER SELECTION FOR MOBILE COMMUNICATIONS DEVICE

(75) Inventors: Sherif Abdel-Kader, Waterloo (CA); Srdjan Majkic, Guelph (CA)

(73) Assignee: Research In Motion Limited, Waterloo, Ontario ( * ) Notice: Subject to any disclaimer, the term of this patent is extended or adjusted under 35 U.S.C. 154(b) by 41 days.

(21) Appl. No.: 12/942,571

(22) Filed: Nov. 9, 2010

(65) Prior Publication Data

US 2011/0059722 A1 Mar. 10, 2011

Related U.S. Application Data

(63) Continuation of application No. 11/675,121, filed on Feb. 15, 2007, now Pat. No. 7,853,240.

(51) Int. Cl.
*H04M 11/04* (2006.01)

(52) U.S. Cl.
USPC ........................................ 455/404.2; 455/564

(58) Field of Classification Search .................. 455/564, 455/404, 432, 404.2
See application file for complete search history.

(56) References Cited

U.S. PATENT DOCUMENTS

| | | | | |
|---|---|---|---|---|
| 6,073,005 A * | 6/2000 | Raith et al. | ................. | 455/404.1 |
| 2002/0160815 A1* | 10/2002 | Patel et al. | .................... | 455/564 |
| 2003/0050039 A1* | 3/2003 | Baba et al. | ..................... | 455/404 |
| 2004/0185824 A1* | 9/2004 | Cheng | ......................... | 455/404.2 |
| 2005/0213716 A1* | 9/2005 | Zhu et al. | ........................ | 379/45 |
| 2006/0068786 A1* | 3/2006 | Florence | .................... | 455/435.2 |
| 2006/0172720 A1* | 8/2006 | Islam et al. | ................ | 455/404.1 |
| 2006/0293024 A1* | 12/2006 | Benco et al. | ............... | 455/404.2 |

FOREIGN PATENT DOCUMENTS

| | | |
|---|---|---|
| EP | 1061716 A2 | 12/2000 |
| EP | 1093317 A1 | 4/2001 |
| EP | 1253798 A2 | 10/2002 |
| EP | 1494492 A1 | 1/2005 |
| WO | 9848577 A | 10/1998 |

OTHER PUBLICATIONS

IEEE Std 802. 11d; Jul. 13, 2001.
Extended European Search Report issued in respect of EP Patent Application No. EP 07102455.8.
Extended European Search Report issued in respect of EP Patent Application No. EP 09154685.3.

* cited by examiner

*Primary Examiner* — George Eng
*Assistant Examiner* — Sowmini Nair
(74) *Attorney, Agent, or Firm* — Ridout & Maybee LLP

(57) ABSTRACT

Automatically selecting an emergency number for use by a mobile communications device enabled for Voice Over Internet Protocol (VoIP) communications, including: receiving at the mobile communications device a geographic indicator in a beacon frame transmitted from a wireless access point of a wireless local area network that is connected to an Internet Protocol network; and determining from a plurality of emergency numbers stored in a storage element of the mobile communications device a selected emergency number in dependence on the received geographic indicator.

11 Claims, 5 Drawing Sheets

EMERGENCY NUMBER SELECTION FOR MOBILE COMMUNICATIONS DEVICE

RELATED APPLICATIONS

This application is a continuation of U.S. patent application Ser. No. 11/675,121 filed Feb. 15, 2007.

FIELD OF TECHNOLOGY

The present application relates to wireless communications devices, and in particular to emergency number selection for mobile communications devices.

BACKGROUND INFORMATION

Emergency numbers used to access emergency services can vary from country to country. For example, the following emergency numbers are used in the following countries: 911 in the United States and Canada, 112 and 119 in South Korea, 111 in New Zealand, 000 and 106 in Australia, and 110, 119 and 112 in China.

Mobile communications devices are sometimes pre-programmed to dial a specified emergency call number when an emergency call function is selected from a menu. However, when a mobile device is roaming outside of its home network, and in particular outside of its home country, the pre programmed information may not include the correct emergency call number.

Additionally, Wireless local area networks (WLANs), including Wi-Fi networks, are becoming more commonly used for providing wireless coverage to a defined area. The WLANs function by having wireless access points that are connected to other networks, including for example the Internet. The WLAN allows users to freely move about a coverage area such as a Wi-Fi hotspot and use a mobile wireless device to engage in services, including real-time packet-based services such as Voice Over Internet Protocol (VoIP), as the device connection is switched from access point to access point.

Accordingly, there is a desire to facilitate accurate emergency calling by mobile communications devices, including devices operation within a WLAN.

BRIEF DESCRIPTION OF THE DRAWINGS

Example embodiments will now be described, by way of example only, with reference to the attached Figures, wherein.

Like reference numerals are used throughout the Figures to denote similar elements and features.

DETAILED DESCRIPTION

Figure 1:
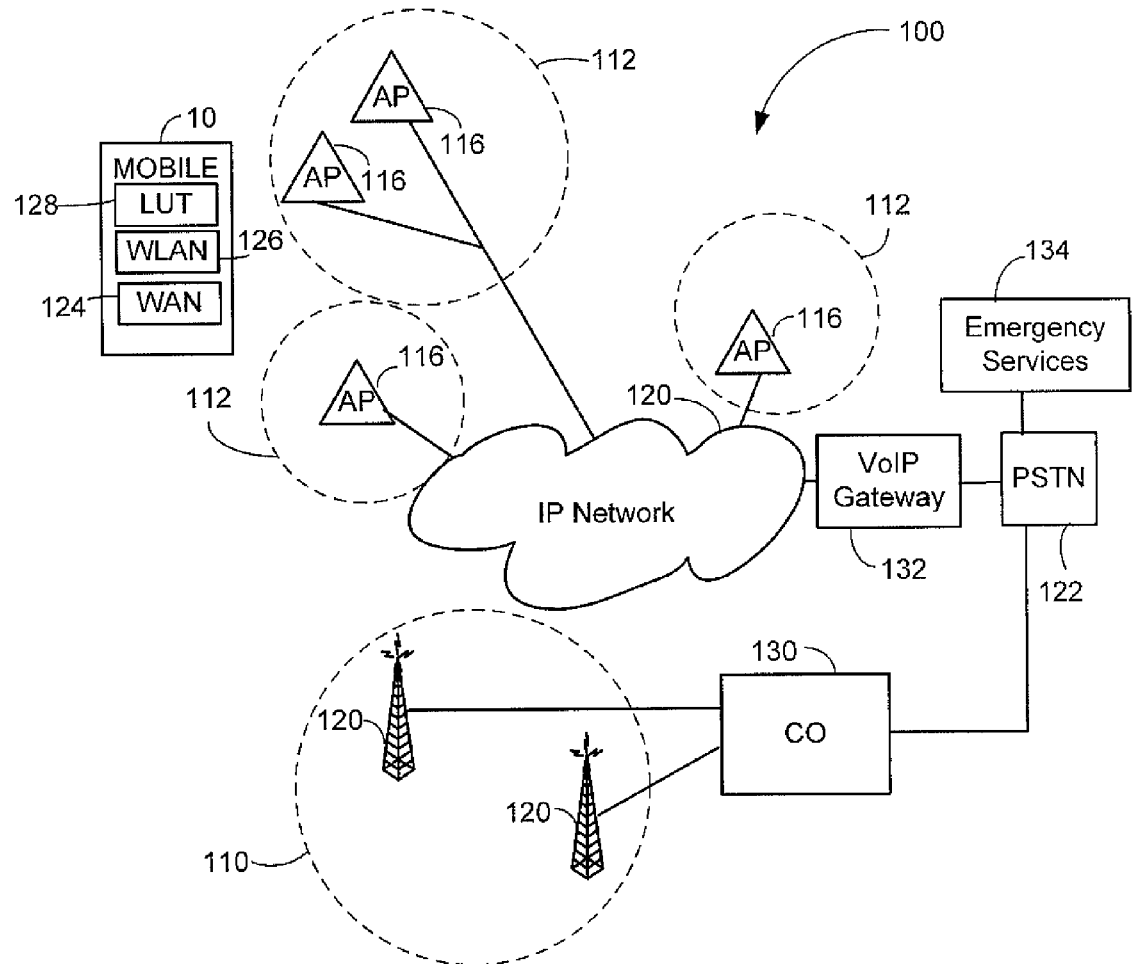
FIG. 1 is a block diagram of a communications system incorporating example embodiments.

Example embodiments described herein include a method of automatically selecting an emergency number for use by a mobile communications device enabled for Voice Over Internet Protocol (VoIP) communications The method includes: receiving at the mobile communications device a geographic indicator in a beacon frame transmitted from a wireless access point of a wireless local area network that is connected to an Internet Protocol network; and determining from a plurality of emergency numbers stored in a storage element of the mobile communications device a selected emergency number in dependence on the received geographic indicator.

Example embodiments described herein also include a mobile communications device enabled to make VoIP calls. The mobile device includes: a controller for controlling the operation of the device; a user input interface coupled to the controller; a display coupled to the controller; a communications subsystem coupled to the controller for exchanging signals with a wireless access point of a wireless local area network; and an electronic storage element coupled to the controller and having stored thereon a plurality of geographic indicators and emergency numbers associated with the geographic indicators. The controller selects an emergency number for use in a VoIP call to an emergency service provider by: (i) receiving through the communications subsystem a geographic indicator in a beacon frame transmitted from a wireless access point of a wireless local area network, and (ii) selecting from the emergency numbers stored on the storage element a selected emergency number in dependence on the received geographic indicator.

According to another example embodiment is a method of automatically calling an emergency number for use by a mobile communications device that has stored thereon a plurality of emergency numbers that are each associated with a country code, wherein the mobile communications device is (i) enabled for voice communications over both a wireless local area network (WLAN) and a wireless wide area network (WAN), and (ii) enabled to receive country code information from the WLAN and the wireless WAN. The method comprises: receiving at the mobile communications device a user input indicating that a user of the mobile communications device wants to initiate an emergency call; determining if a wireless WAN is acquired by the mobile device at the time that the user input is received, and if so initiating a call from the mobile communications device to an emergency number selected from the plurality of emergency numbers in dependence on country code information received by the mobile communications device from the wireless WAN; and if a wireless WAN is not acquired by the mobile device at the time that the user input is received, then determining if a WLAN is acquired by the mobile device and if so initiating a call from the mobile communications device to an emergency number selected from the plurality of emergency numbers in dependence on country code information received by the mobile communications device from the WLAN.

According to another example embodiment is a mobile communications device enabled to make telephone calls. The mobile communications device includes: a controller for controlling the operation of the device; a user input interface coupled to the controller; a plurality of communications subsystems coupled to the controller for exchanging signals with respective wireless networks including a wireless local area network and a wireless wide area network (WAN); and an electronic storage element coupled to the controller and having stored thereon a plurality of emergency numbers that are each associated with a country code. The controller is configured to, upon receiving through the user input interface a user input indicating that a user of the mobile communications device wants to initiate an emergency call: determine if a wireless WAN is acquired through at least one of the communications subsystems at the time that the user input is received, and if so initiate a call from the mobile communications device to an emergency number selected from the plurality of emergency numbers in dependence on country code information received by the mobile communications device from the wireless WAN; and if a wireless WAN is not acquired through at last one of the communications subsystems at the time that the user input is received, then determine if a WLAN is acquired through one of the communications subsystems and if so initiating a call from the mobile communications device to an emergency number selected from the plurality of emergency numbers in dependence on country code information received by the mobile communications device from the WLAN.

According to another example embodiment is a method of selecting an emergency number for use by a mobile communications device that is enabled for voice communications and has stored thereon a plurality of geographic indicators and emergency numbers associated with the geographic indicators, the geographic indicators each having a respective call order preference relative to the other geographic indicators. The method includes: detecting user input to initiate an emergency call; selecting from the stored geographic indicators the geographic indictor having the highest call order preference at the time that the user input is detected; and determining from a plurality of emergency numbers stored in the storage element of the mobile communications device a selected emergency number in dependence on the selected geographic indicator.

According to another example is a mobile communications device enabled to make telephone calls that includes: a controller for controlling the operation of the device; a user input interface coupled to the controller; a plurality of communications subsystems coupled to the controller for exchanging signals with respective wireless networks; and an electronic storage element coupled to the controller and having stored thereon a plurality of geographic indicators and emergency numbers associated with the geographic indicators; wherein the geographic indicators each have a respective call order preference relative to the other geographic indicators. The controller is configured for selecting an emergency number for use in a telephone call to an emergency service by: selecting from the stored geographic indicators the geographic indicator having the highest call order preference at the time that the emergency call is initiated; and determining from a plurality of emergency numbers stored in the storage element of the mobile communications device a selected emergency number in dependence on the selected geographic indicator.

Referring first to FIG. 1, there is a block diagram representative of a communication system 100 according to at least one example embodiment of the present invention. The communication system 100 includes mobile electronic devices 10 (only one of which is shown in FIG. 1), a plurality of hotspots or wireless local area networks (WLAN) 112, and an Internet Protocol (IP) network 120 which can, for example, include the Internet. One or more public switched telephone networks (PSTN) 122 may be connected to the IP network 120 through appropriate gateways including, for example, a VoIP gateway 132. In some example embodiments, the communications system 100 also includes a cellular or wireless wide area network (WAN) 110. An emergency service provider or dispatch center 134 is connected to PSTN 122 for receiving calls to one or more dedicated emergency numbers and coordinating the dispatch of emergency services such as firefighting, ambulance and police services.

WLANs 112 in at least some example embodiments is a Wi-Fi™ compliant network conforming to criteria set by the Wi-Fi Alliance. In example embodiments, WLAN 112 can conform to one or more of the IEEE 802.11 group of standards, for example 802.11a, 802.11b, 802.11g, and/or 802.11n however other communications protocols could also be used for WLAN 112. In at least some example embodiments, WLAN 112 is also 802.11d compliant with country codes being included in beacon frames. As known in the art, each WLAN 112 has a coverage area and includes one or more wireless radio frequency (RF) access points (AP) 116. In at least some example embodiments, WLANs 112 are operated by enterprises or organizations (such as a businesses, universities, municipalities, service organizations, etc.) and access points AP 116 are connected to the IP network 120 through communications links that can include wired local area networks, gateways and firewalls among other things.

WAN 110 in at least some example embodiments is a packet or non-packet based cellular network that supports voice calls and includes a plurality of base stations 120 (two of which are shown in FIG. 1) that each provide wireless RF coverage to a corresponding area or cell. As known in the art, base stations 120 are each connected to a central office (CO) 130 that is connected to a PSTN (Public Switched Telephone Network) 122. WAN 110 will typically be operated by a cellular network service provider that sells subscription packages to users of mobile devices. WAN 110 could be a number of different types of network including by way of non-limiting example, GSM (Global System for Mobile Communication), GPRS (General Packet Radio System), iDEN (integrated Digital Enhanced Network) or various other third generation networks such as EDGE (Enhanced Data rates for GSM Evolution) or UMTS (Universal Mobile Telecommunications Systems).

Mobile device 10 has the capability to establish voice calls wirelessly over WLANs 112, and in this regard includes a WLAN communications subsystem 126 for communicating with access points 116 of WLANs 112. In an example embodiment, voice calls made by a mobile device 10 within using a WLAN 112 are Voice-over-Internet Protocol (VoIP) calls in which media sessions are established between the mobile device 10 and a further terminal end point over IP-based network 120 using real-time transport protocol (RTP) on top of the user datagram protocol (UDP). Session initiation protocol (SIP) or other control protocols may be employed to set-up, manage, control and/or tear down media paths between termination points. In some embodiments, one or more respective gateways connects the IP network 120 to one or more PSTNs such that VoIP calls made from the mobile device 10 can be converted at the gateway for signal exchange through the PSTN 122.

In at least some example embodiments, mobile device 10 also has the ability to establish voice calls wirelessly over WAN 110, and in this regard in some example embodiments includes a WAN communications subsystem 124 for communicating with base stations 120 of WAN 110. The mobile device 10 is, in at least some example embodiments, configured to roam between WLANs 112 and WANs 110. In such embodiments, mobile device 10 has the capability to establish voice calls wirelessly over either WAN 110 or WLAN 112. WANs 110 and WLANs 112 may have coverage areas that at least partially overlap in some areas. In at least some example embodiments, the coverage area of various WANs 110 is much larger than that of WLANs 112 and may overlap all or a large percentage of the coverage area of WLAN 112. However, WLANs 112 may have sole coverage in some regions or hotspots that are dead spots in WANs 110, for example, some interior locations of an enterprise's buildings. In example embodiments the mobile device 10 is configured to communicate voice calls over WLAN 112 when within the coverage area of a suitable WLAN 112, and over WAN 110 when outside of the coverage area of suitable WLAN 112 and inside the coverage area of WAN 110. Such a configuration may allow, among other things, the mobile device 10 to minimize toll charges to the operator of network 110 and the operators of other networks (including long distance networks) that WAN 110 is connected to; allow the mobile device to take advantage of better local coverage available within the WLAN 112; and/or allow the mobile device to take advantage of better security measures available within the WLAN 112. In some example embodiments, the mobile device 10 is configured only for communicating with WLAN 112, and does not includes a WAN communications subsystem 124.

Mobile device 10 can be, among other things, a suitably configured handheld or user wearable wireless communications device such as a cell phone or phone enabled PDA or pocket computer, or could also be a lap-top computer that is enabled to make wireless phone calls through a WLAN 112 using VoIP technology and possibly also through WAN 110 using cellular technology.

In example embodiments, different WLANs 112 and different WANs 110 can be located in different countries, and the mobile device 10 is configured to be used in WLANs 112 and WANs 110 in different countries. With respect to WAN 110, geographic identifiers are typically transmitted from the base stations 120 that identify the country that the base stations are located within. For example, in a CDMA or a GSM WAN network 110, a geographic identifier in the form of a Mobile Country Code (MCC) is broadcast on the paging channel of the CDMA or GSM WAN. With respect to WLANs 112, the IEEE 802.11d standard requires that access points AP 116 each transmit in the beacon frames that they periodically transmit a country information element that identifies the country in which the access point AP 116 is located. Under IEEE 802.11d, the country information element will typically be in the form of an International Standards Organization (ISO) Country Code. ISO 3166 Country Codes and the Mobile Country Codes can be different codes, and accordingly the actual geographic identifiers code received from the base stations 120 of a WAN 110 can be different that the geographic identifier code received from the access point 116 of a WLAN 112 in the same country or area.

As indicated above, emergency numbers used to access emergency services dispatch centers 134 can vary from country to country. U.S. patent application Ser. No. 11/048,766 filed Feb. 3, 2005 and published Aug. 3, 2006 as US 2006/017220 A1, the entire contents of which incorporated herein by reference, discloses a method and apparatus for the autoselection of an emergency number in a mobile station. Such patent application teaches, among other things, the use of geographic indicator to select an appropriate emergency number to call from a mobile station.

The embodiments described herein are concerned with selecting an appropriate emergency number for calling within a WLAN-implemented VoIP environment. According to example embodiments that will be described in greater detail below, mobile device 10 has stored on it a look up table (LUT) 128 that associates ISO country code information with the emergency number(s) used in the respective countries. Based on the country information element received from a wireless access point AP116, the mobile device 10 can access the look up table stored on it to automatically determine what emergency number to dial in the event that an emergency number call has to be placed through the access point. Using this method, the emergency number to use for an emergency call in a VoIP environment can be determined.

Figure 2:
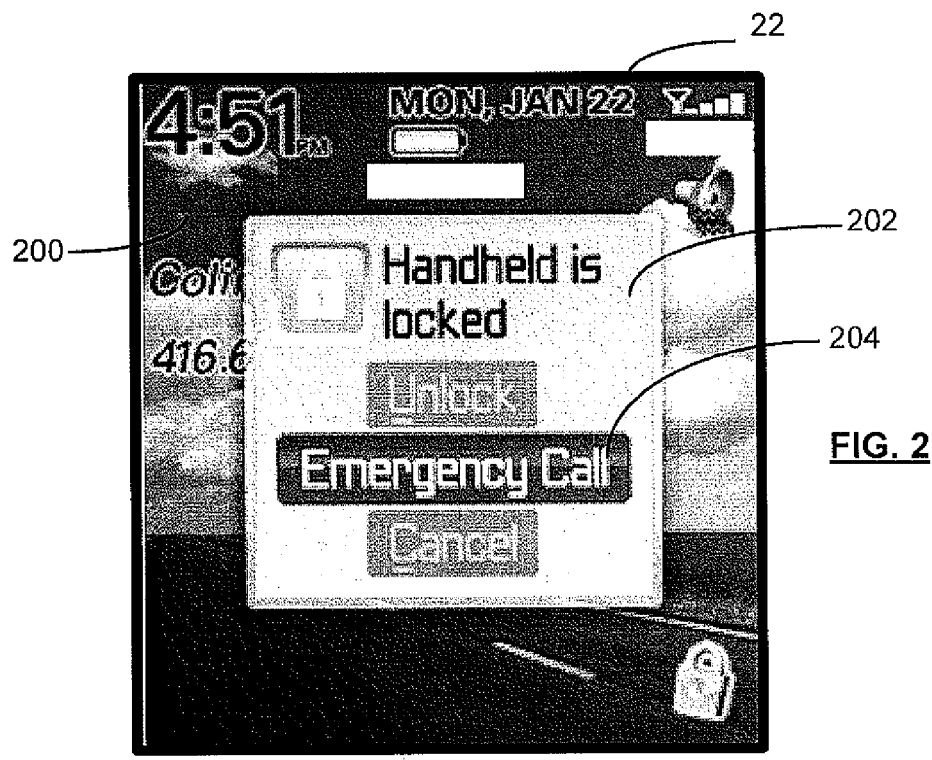
FIGS. 2 to 4 show representative user interface screens displayed on a mobile device as an emergency call option is selected.

To assist in providing an understanding of the embodiments described herein, one example of how an emergency call can be initiated on mobile device 10 will be described with reference to FIGS. 2 to 4, which show screen shots of a graphical user interface 200 displayed on a display 22 of mobile device 10. In the presently described embodiment, the mobile device 10 is configured such that when the device is locked access to substantially all the functionality of the mobile device 10 is prohibited until the user is authenticated through an authentication process such as entry of a valid password. However, one device function that remains available even when the device is locked is the ability of the mobile device 10 to initiate a call to an emergency number. As shown in FIG. 2, when predetermined keys or other user inputs are made to the mobile device 10 when it is in a locked state, a dialog window 202 is displayed which includes user selectable options such as "Unlock"; "Emergency Call"; and "Cancel". In the illustrated example, these options are represented by on-screen user-selectable icons or buttons, with the "Emergency Call" option being represented by a user selectable on-screen "Emergency Call" icon or button 204. The device 10 includes a user input interface such as a keyboard with a navigational input and selection mechanism(s), touch screen interface, trackball or scrollwheel, voice input, or combinations of the forgoing that allow the user to select and input the "Emergency Call" option.

Figure 3:
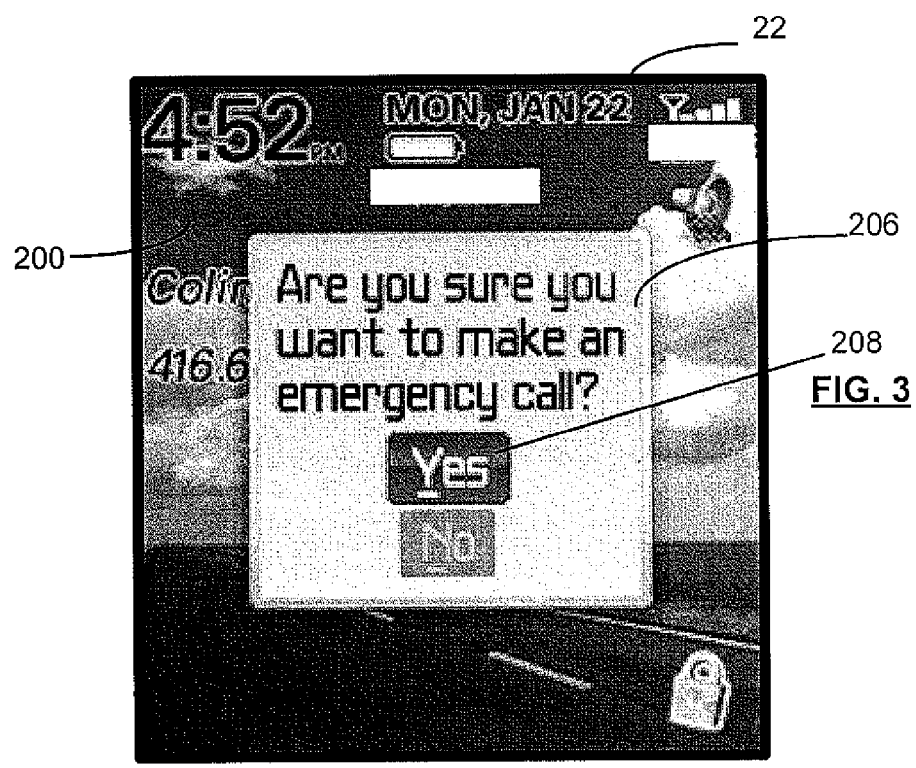
Figure 4:
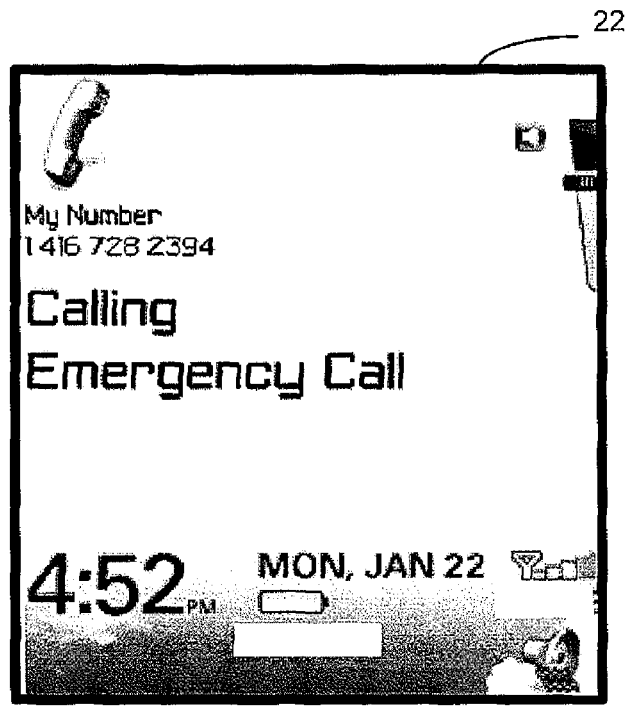

FIG. 3 illustrates a confirmation dialog window 206 that appears, in at least some embodiments, on interface 200 after user selection of the "Emergency Call" button 204. The dialog window 206 provides the user with the option to continue and initiate the call, or to cancel, as represented by user selectable "Yes" button 208 and "No" button. Selection of the "No" button terminates the emergency call process. Selection of the "Yes" button 208 causes, with reference to FIG. 4, causes the mobile device 10 to initiate an emergency call to an appropriate emergency number that has been selected based on geographic information provided to the mobile device.

An overview of the emergency call process in a VoIP environment having been provided, additional detail will now be provided. As indicated above, lookup table LUT 128 associating country code information with emergency call number information is stored in a storage element such as flash memory of the mobile device 10. The following table is representative of the information stored in LUT 128 in some example embodiments:

TABLE 1

| Country | ISO 3166 Country Code (Numeric code/ Letter code) | MCC | Non-TTY Emergency Number |
|---|---|---|---|
| Australia | 036/AU | 505 | 000 |
| Canada | 124/CA | 302 | 911 |
| . | . | . | . |
| . | . | . | . |
| . | . | . | . |
| Korea (South) | 410/KR | 450 | 112 |
| New Zealand | 554/NZ | 530 | 111 |
| U.S.A. | 840/US | 310-316 | 911 |

The present application relates to wireless communications devices, and in particular to emergency number selection for mobile communications devices. In at least one example embodiment, both the ISO Country Code information (including either the numeric code, letter code, or both) and the MCC geographic codes are included in the LUT 128 and correlated with the respective country emergency phone numbers. In embodiments where the mobile device 10 only operates in WLAN environments (for example, a laptop computer configured for VoIP calls), the MCC geographic codes may be omitted from the LUT 128. The LUT 128 can be preloaded on the persistent storage of a mobile device 10 before it is delivered to a customer, or could be downloaded onto the device 10, for example through the IP network 120. By way of example, the stored LUT 128 can be periodically updated as required either partially or in its entirety through administrative messages sent to the device 10, or though downloads initiated by the user of the device.

Figure 5:
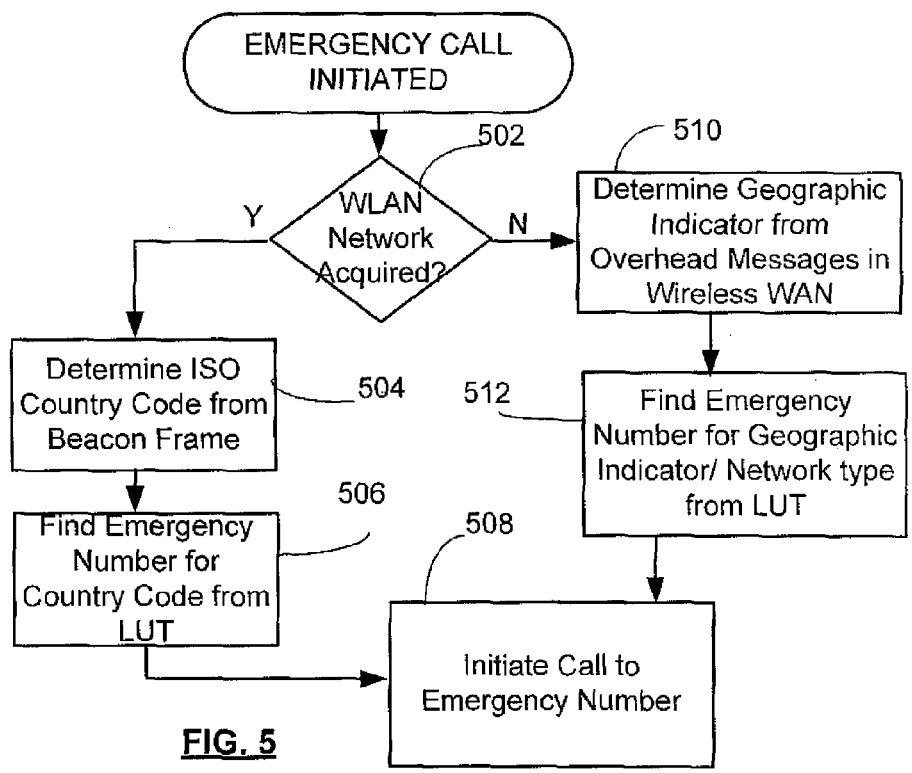
FIG. 5 is a flow chart representative of an emergency calling process implemented by a mobile device according to example embodiments.

With reference to FIG. 5, a possible selection method is illustrated for selecting an appropriate emergency number from the look-up table when the user initiates an emergency call. As indicated above, one manner in which the user can initiate a call is by selecting an "Emergency Call" button 204 without entering any specific number. As indicated in FIG. 5, in step 502, the mobile device 504 determines if a WLAN network is currently acquired by the device (as opposed to a WAN network). Step 502 can be omitted in devices that are only active in WLAN networks. As indicated in step 504, the device 10 then determines, based on the beacon frames transmitted by the access point 116 that the device is in communication with, the appropriate ISO country code for the current location of the device. It will be appreciated that step 504 can be performed prior to the emergency call being initiated—for example the device 10 may acquire and store for future reference the ISO country code each time it acquires and establishes communications with a new access point AP 116.

As indicated in step 506, when the device 10 is active in a WLAN network when an emergency call is initiated, the device 10 then selects the appropriate emergency number from LUT 126 based on the ISO country code received through WLAN beacon frames. Again, as with step 504, step 506 could actually be performed prior to initiation of the emergency call by a user—for example each time the device acquires and establishes communications with a new access point AP 116, the device may acquire the ISO country code and immediately retrieve the appropriate emergency number from the LUT 126 for storage at another memory location for future use when an emergency call is initiated while the same network is acquired. As indicated at step 508, the mobile device then attempts to initiate a call to the selected emergency call number. In the case of a WLAN network, the call is initiated as a VoIP call through IP network 120.

Returning again to step 502, in embodiments in which the mobile device 10 is also configured to work with air interface networks other than a WLAN 112, if a determination is made in step 502 that the device does not currently have an acquired WLAN network but has acquired another network interface (for example through WAN 110), then as indicated in step 510 a geographic indicator can be selected based on overhead messages in the other network (for example the MCC in a CDMA or GSM WAN network) and the appropriate emergency number selected from LUT 128 for the geographic indicator and network type.

In some example embodiments, a network may not be acquired when a user of the device attempts to initiate an emergency call, in which case the mobile device will acquire the network, then proceed to step 502. In some example embodiments, multiple networks may simultaneously be acquired by the mobile device 10, and the device may select one of the networks to make the emergency call on according to predetermined criteria (for example, the network having the strongest signal strength, or the network traditionally known as being the most reliable). In some example embodiments the device may be configured to sequentially try to call through all acquired networks until a successful connection can be made if the emergency number cannot be successfully reached on the first network.

Figures 6, 7:
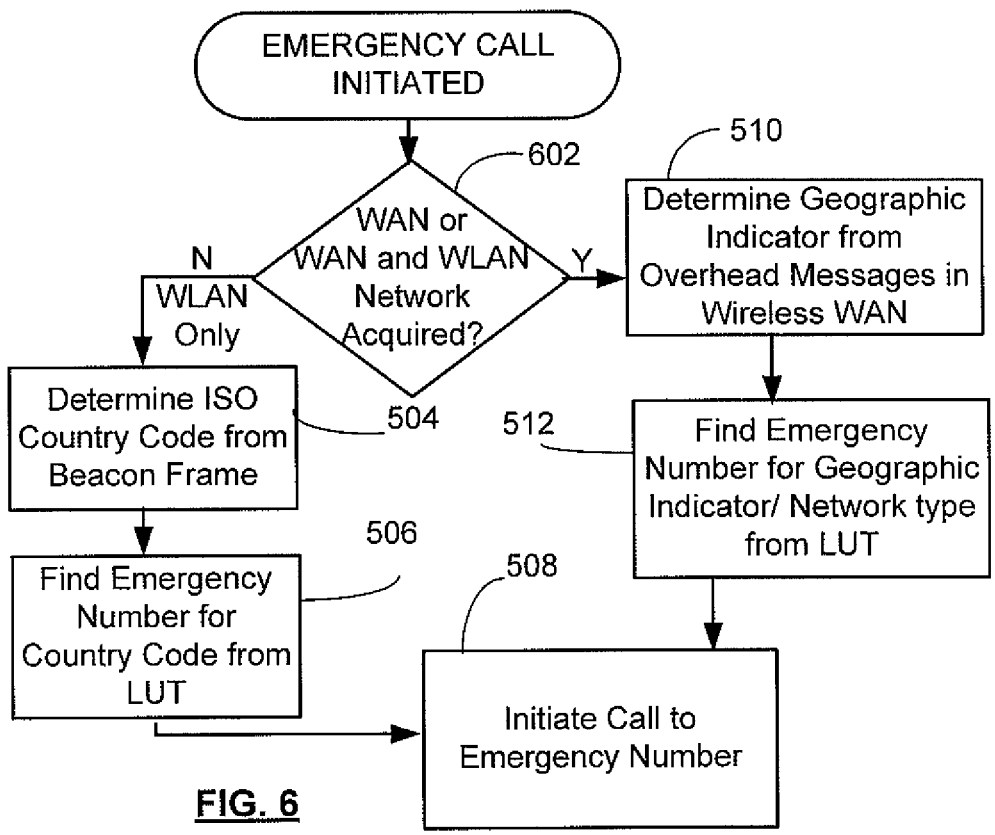
FIG. 6 is a flow chart representative of an emergency calling process implemented by a mobile device according to further example embodiments.
FIG. 7 is representative of a list of alternative country codes used in example embodiments.

In one example embodiment, when the mobile device 10 simultaneously is active in both a WAN 110 and a WLAN 112, the device 10 is configured to prefer the mobile country code information available from a wireless WAN 110 over the country code information available from the WLAN 112 when selecting a emergency number. Such a preference recognizes that a wireless WAN 110 will typically be set up and maintained as part of a cellular network that is operated by a sophisticated and highly regulated carrier, and so the geographic identifiers that are transmitted in the wireless WAN overhead are generally expected to have a high degree of accuracy. A WLAN 112 in at least some environments may not support 802.11d and/or be set up and operated by a less sophisticated entity, with the result that in at least some jurisdictions where overlapping wireless WAN and WLAN networks exists there is a greater likelihood that an WLAN Access Point AP 116 will either omit the country code from its beacon frames or use an incorrect country code. In this regard, FIG. 6 shows a emergency number selection method that is similar to the method described above in respect of FIG. 5, except that decision block 502 (determine if WLAN is acquired) has been replaced with decision block 602. In decision block 602, a determination is made if either a wireless WAN 110 on its own or both a WLAN 112 and a wireless WAN 110 are simultaneously acquired by the mobile device 10. If either a wireless WAN 110 on its own or both a WLAN 112 and a wireless WAN 110 are simultaneously acquired, then the geographic indicator found in the overhead messages of the wireless WAN is used to select the emergency number (steps 510 and 512). If only a WLAN 112 is acquired, then the country code information from the WLAN beacon frames is used to select the emergency number (steps 504 and 506). Thus, in the method of FIG. 6, when the device 10 is active in both a wireless WAN 110 and a WLAN 112, the mobile device is configured to use the geographic indicator from the wireless WAN 110 for emergency number look up. The actual network used by the mobile device 10 to place the call to the selected emergency number in step 508 can be selected in some example embodiments based on conventional roving criteria, and thus in some situations, the call to an emergency number selected based on a geographic indicator from a wireless WAN may be used to initiate an emergency call through the WLAN.

Situations may arise in which a valid geographic indicator is not currently available to a mobile device at the time an emergency call is placed (for example, if the currently acquired WLAN or WLAN access point does not include a country code in its beacon frame or includes an incorrect country code or a country code that does not have a corresponding entry in LUT), and accordingly in at least some example embodiments, the mobile device saves and continuously updates a stack or list of country codes in a preferred order of use for selecting emergency call numbers. For example, FIG. 7 illustrates a country code list 702, that can be stored in a storage element of the mobile device 10, in which multiple country codes (with corresponding network type) are stored in a preferential call order. By way of example, in one embodiment, when the mobile device 10 currently has acquired both a wireless WAN 110 and a WLAN 112 access point AP 116, and has received country codes from both networks, the device 10 stores in list 702 the mobile country code received from the wireless WAN 110 as the most preferred country code in location 700(1), and the country code received from the WLAN 112 as a backup country code in location 700(2). Remaining spots in the list 702 can be filled with the country codes from the most recent previous WLAN access points or wireless WAN base stations that were acquired by the mobile device 10. By way of example in FIG. 7, location 700(3) stores the county code information from the most recently acquired WLAN prior to the currently acquired WLAN.

In one example embodiment, the event that the mobile device currently only has acquired a WLAN 112 and no wireless WAN 110 is acquired, then the country code received from the WLAN 112 can be stored as the most preferred country code in location 700(1), and the country code from the most recently previously acquired wireless WAN 110 stored in location 700(2). In at least one example embodiment, an administrator or factory set default country code is included in the list 702 (for example in location 700(4)) that corresponds to the home country of the device 10.

When an emergency call is initiated from a mobile device 10 having a stored list 702, the mobile device 10 is programmed to sequentially select emergency numbers from LUT 506 based on the order in which country codes are stored in the list 702. For example, the mobile device 10 will first look up the emergency number associated with the country code and network type stored in location 700(1), and then attempt to place a call to that number. If the call cannot be successfully completed, then the mobile device will look-up and use the emergency number associated with the country code and network type stored in location 700(2) and so on, until a call can be successfully placed or all numbers result in failure. In some embodiments, if a country code and network type stored in list 702 does not have a corresponding entry in the LUT 128, the mobile device will proceed to the next country code and network type stored in the next list location. In some example embodiments, rather than storing the country code and network type information in ordered list 702, each time a new network or access point is acquired the mobile device is configured to continuously look up in LUT 128 the associated emergency number and store the actual emergency number in the ordered list 702 such that when an emergency call is initiated, the mobile device 10 can directly access the emergency numbers in order of preference.

The number of country codes or emergency numbers stored in the preferentially ordered list 702 can vary from that shown in FIG. 7, as can the criteria used for ordering the list. The list 702 can be integrated into the methods shown in FIGS. 5 and 6.

In some example embodiments, the emergency call can be initiated through methods other than user selection of a dedicated emergency call option. For example, the user may try to dial or input the emergency number directly into a phone interface presented by a phone application on the mobile device 10. For example, the user may input or dial "911". In at least one example embodiment, the device 10 is configured to detect when any one of the emergency numbers identified in LUT 128 is input by a user to the phone application on the device 10, and then confirm, based on LUT 128 and geographic information received from the network in which the device 10 is currently active (e.g. ISO country code information in the case of a IEEE 802.11 WLAN network or MCC information in the case of a CDMA or GSM WAN network), if the user has used the correct emergency number for the current location of the device. If the user has dialled the correct emergency number for the current device location, the device initiates a call to the input number. However, if the use has dialled an emergency number that does not correspond to the current device location, then the correct number for the current location is automatically taken from LUT 128 and substituted for the user input number and used to initiate the emergency call.

In some example embodiments, LUT 128 also includes a plurality of possible misdialed numbers that could be emergency numbers. For example, the numbers "944" and "922" can be included in LUT 128 as possible misdialings of "911". In such example embodiments, the device 10 is configured to detect when the user inputs a number that could be a misdialed emergency number, and then determine based on LUT 128 and geographic information received from the network in which the device 10 is currently active (e.g. ISO country code information in the case of a IEEE 802.11 WLAN network or MCC information in the case of a CDMA or GSM WAN network) what the correct emergency number is for the current location of the device, and to initiate a call to the correct emergency number. In some embodiments, the user is asked through a user interface such as shown in FIG. 3 to confirm that they want to place the emergency call.

In at least some example embodiments, different emergency call numbers may be used in the same country for different device configurations. For example, some mobile devices may be configured to make TTY (text telephony) calls for the hearing impaired, and some countries have dedicated TTY emergency call number that are different from non-TTY emergency call numbers. In some embodiments, LUT 128 includes the TTY emergency call numbers associated with various countries, and when the emergency number is being selected on a mobile device 10 that has been configured to make TTY calls, the TTY emergency number is automatically selected based on geographic information, rather than the non-TTY emergency number.

Figure 8:
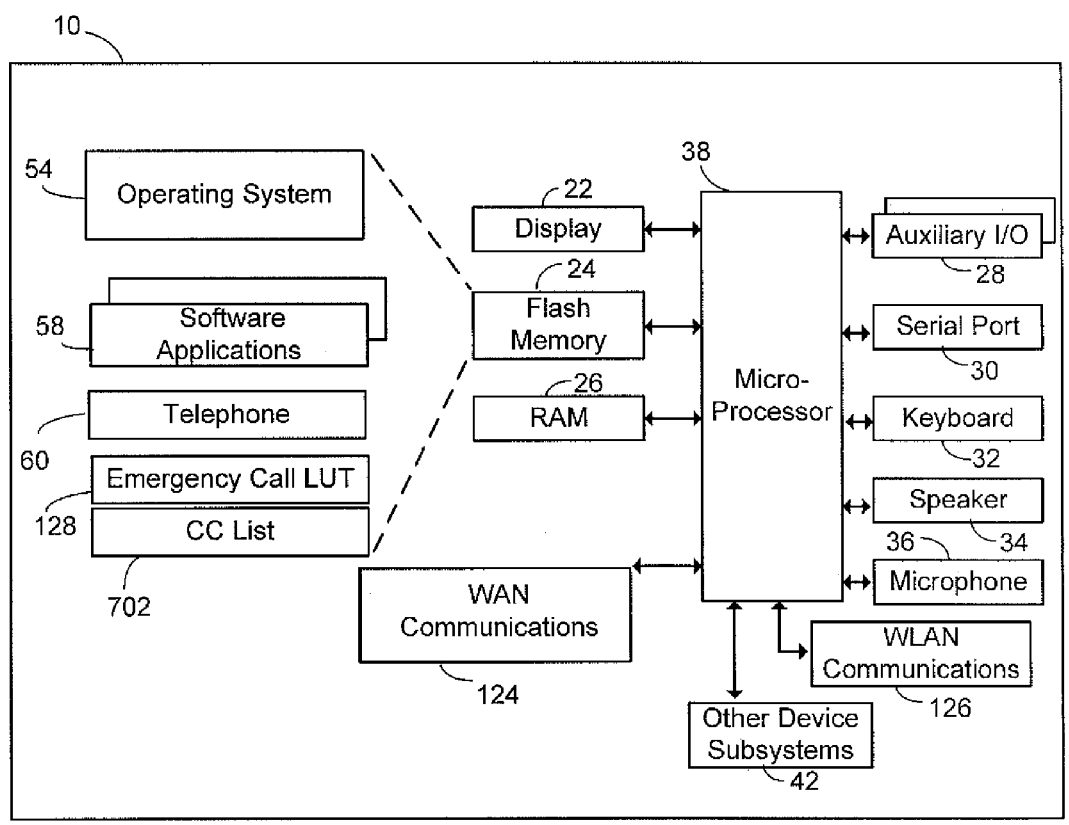
FIG. 8 is a block diagram showing an example of a mobile electronic device that can be used in the communications systems of FIG. 1.

An example of a mobile electronic device 10 with which at least some embodiments of the invention may be used is shown in FIG. 8. As indicated above, the device 10 includes wireless WAN communication subsystem 124 for two-way communications with wireless WAN 110 and a WLAN communication subsystem 126 for two way communications with WLAN 112. Communications subsystems 124 and 126 include RF transceivers and may also include signal processor such as DSPs for example. The device 10 includes a controller in the form of one or more microprocessors 38 that controls the overall operation of the device. The microprocessor 38 interacts with communications subsystems 124 and 126 and also interacts with further device subsystems such as the display 22, flash memory 24, random access memory (RAM) 26, auxiliary input/output (I/O) subsystems 28 (which may include a scroll-wheel or track ball, for example), serial port 30 (which may include a USB port, for example), keyboard or keypad 32, speaker 34, microphone 36, and any other device subsystems generally designated as 42.

Operating system software 54 and various software applications 58 used by the microprocessor 38 are, in one example embodiment, stored in a persistent store such as flash memory 24 or similar storage element. Software applications 58 may include a wide range of applications, including an address book application, a messaging application, a calendar application, and/or a notepad application. One application included among applications 58 is telephone application 60 for enabling the mobile device 10 to function as a mobile phone in a VoIP environment and possibly other environments. The computer instructions for implementing the automatic emergency number selection and dialling features described above may be a part of phone application 60 or may be a separate application, or may be part of a separate application, for example. LUT 128 and call order list 702 (which can be part of LUT 128) can also be stored on Flash memory 24 in example embodiments. Those skilled in the art will appreciate that the operating system 54, specific device applications 58, 60, LUT 128, and list 702 or parts thereof, may be temporarily loaded into a volatile store such as RAM 26. Received communication signals may also be stored to RAM 26.

The microprocessor 38, in addition to its operating system functions, enables execution of software applications 58 (which can include software applications 60) on the device. A predetermined set of applications 58 which control basic device operations, including at least data and voice communication applications for example, will normally be installed on the device 10 during manufacture. Further applications may also be loaded onto the device 10 through the network 110, an auxiliary I/O subsystem 28, serial port 30, communications subsystem 124, 126 or any other suitable subsystem 42, and installed by a user in the RAM 26 or a non-volatile store for execution by the microprocessor 38.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A mobile communications device enabled to make telephone calls, comprising:
    a controller for controlling the operation of the device;
    a user input interface coupled to the controller;
    a plurality of communications subsystems coupled to the controller for exchanging signals with respective wireless networks including a wireless local area network and a wireless wide area network (WAN); and
    an electronic storage element coupled to the controller and having stored thereon a plurality of emergency numbers that are each associated with a country code;
    wherein the controller is configured to, upon receiving through the user input interface a user input indicating that a user of the mobile communications device wants to initiate an emergency call:
    determine if a wireless WAN is acquired through at least one of the communications subsystems at the time that the user input is received, and if so initiate a call from the mobile communications device to an emergency number selected from the plurality of emergency numbers in dependence on country code information received by the mobile communications device from the wireless WAN; and
    if a wireless WAN is not acquired through at last one of the communications subsystems at the time that the user input is received, then determine if a WLAN is acquired through one of the communications subsystems and if so initiating a call from the mobile communications device to an emergency number selected from the plurality of emergency numbers in dependence on country code information received by the mobile communications device from the WLAN.

2. The device of claim 1 wherein the WLAN comprises a WI-FI network and the Wireless WAN comprises at least one of a Global System for Mobile Communication (GSM) network and a Code Division Multiple Access (CDMA) network.

3. The device of claim 1 wherein the WLAN includes a Wi-Fi network, and the country code information received by the mobile communications device from the WLAN includes country code information received from one or more Wi-Fi access points of the Wi-Fi network.

4. The device of claim 1 wherein the WLAN is an IEEE 802.11a, 802.11b, 802.11g or 802.11n compliant network.

5. The device of claim 1 wherein the country code information received by the mobile communications device from the WLAN is received in a beacon frame that is an 802.11d compliant beacon frame.

6. The device of claim 3 wherein the processor is configured for receiving and storing at the mobile communications device country code information received from a plurality of Wi-Fi access points that are successively acquired by the mobile communications device, wherein initiating the call from the mobile communications device to the emergency number selected from the plurality of emergency numbers in dependence on country code information received by the mobile communications device from the WLAN comprises: determining if valid country code information has been received from a currently acquired Wi-Fi access point and if not, then selecting the selected emergency number in dependence on country code information received from another one of the plurality of Wi-Fi access points.

7. The device of claim 1 wherein the country code information received by the mobile communications device from the wireless WAN includes a Mobile Country Code (MCC), and country code information received by the mobile communications device from the WLAN includes an International Standards Organization (ISO) country code, wherein the processor is configured for: storing on a storage element of the mobile communications device a lookup table that includes a list of International Standards Organization (ISO) country codes and Mobile Country Codes (MCC) and associated emergency numbers for jurisdictions identified by the ISO country codes and Mobile Country Codes (MCC), wherein initiating the call from the mobile communications device to the emergency number selected from the plurality of emergency numbers in dependence on country code information received by the mobile communications device from the wireless WAN comprises: selecting the emergency number from the lookup table in dependence on the MCC received from the wireless WAN, and wherein initiating the call from the mobile communications device to the emergency number selected from the plurality of emergency numbers in dependence on country code information received by the mobile communications device from the WLAN comprises: selecting the emergency number from the lookup table in dependence on the ISO country code received from the WLAN.

8. The device of claim 7 wherein the processor is configured for storing the ISO country codes and MCCs in the lookup table according to a preferred calling order, wherein emergency numbers are selected from the lookup table in dependence on an order in which the country codes are stored in the lookup table.

9. The device of claim 1 wherein receiving at the mobile communications device the user input indicating that the user of the mobile communications device wants to initiate an emergency call comprises detecting user selection of a dedicated emergency call option on the mobile communications device.

10. The device of claim 1 wherein a plurality of possible emergency numbers are stored on the mobile communication device, and wherein receiving at the mobile communications device the user input indicating that the user of the mobile communications device wants to initiate the emergency call comprises determining if the user has entered a number that matches one of the possible emergency numbers.

11. The device of claim 10 wherein the possible emergency numbers includes possible misdialed emergency numbers.

* * * * *